(No Model.)

S. H. FRENCH & W. J. MALTBY.
NUT LOCK.

No. 365,741.    Patented June 28, 1887.

WITNESSES:
Fred G. Dieterich
O. B. Turpin

INVENTOR:
S. H. French
W. J. Maltby
BY Munn & Co.
ATTORNEYS.

UNITED STATES PATENT OFFICE.

STEPHEN H. FRENCH AND WILLIAM J. MALTBY, OF BAIRD, TEXAS.

NUT-LOCK.

SPECIFICATION forming part of Letters Patent No. 365,741, dated June 28, 1887.

Application filed December 7, 1886. Serial No. 220,900. (No model.)

*To all whom it may concern:*

Be it known that we, STEPHEN H. FRENCH and WILLIAM J. MALTBY, of Baird, in the county of Callahan and State of Texas, have invented a new and useful Improvement in Nut-Locks, of which the following is a specification.

This invention is an improved nut-lock, and seeks to provide a simple construction which may be easily applied to lock and removed to unlock the nut.

The invention consists in forming the nut-lock with a wedge or body and a head having extensions or flanges, constructed substantially as hereinafter described.

Figure 1:
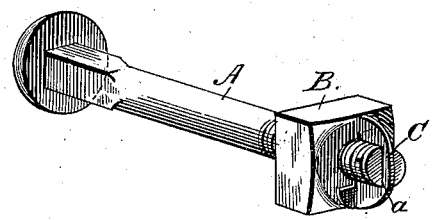
Figure 2:
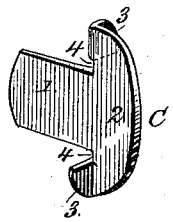
Figure 3:
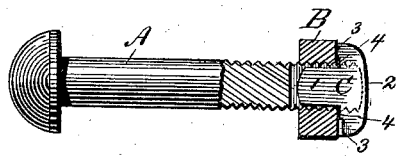

In the drawings, Figure 1 is a perspective view of our invention as in use. Fig. 2 is a detail view of the lock-key. Fig. 3 is a side view, part in section, of the improvement in use.

The bolt A has a slit, a, formed longitudinally in its point end, and the nut B, screwed on such end, may be of the ordinary construction. We form the key C with a body or wedge, 1, and a head, 2. At its inner edge the head is provided with flanges or extensions 3, arranged on opposite sides of the body 1. When the key is ready for use, these extensions 3 are bent in opposite directions at an angle to the main portion of the head, and preferably at about right angles thereto. By preference these extensions are separated from the body or wedge 1 by intermediate spaces, 4, which are made sufficiently wide to permit the extensions to rest clear of the threads of the bolt, in order that they will not come in contact with and injure such threads in the insertion and removal of the key.

In use the nut to be locked is turned onto the slitted bolt to the desired position, and the key is driven into the slit a, its extensions resting against the face of the nut, as shown in Figs. 1 and 3. When locked, the nut may be removed by forcibly turning it off the bolt, the nut serving to remove the key.

An important advantage resulting from the extensions, as shown, is that they form bearings against which the nut will not bind in being turned off the bolt. By reason of these flanges the key will operate with a rough nut, and when used with a finished nut it will not abrade or otherwise injure the face of said nut.

It will be understood that the extensions 3 need not be bent, except just prior to the use of the device; but the keys may be manufactured and put on the market with the extensions unbent, for economy of space in shipping and storing the keys, and the extensions be bent by the purchaser.

It will be seen that, in addition to the functions before described as appertaining to the extensions or flanges, they serve to prevent the wedge or body of the key cutting into the threads of the nut.

Manifestly the keys may be used over and over again, no injury resulting to them from use.

Having thus described our invention, what we claim as new is—

1. A nut-lock key having a body or wedge portion and a head, and having such head provided at its inner edge with flanges or extensions, the inner edges of the flanges or extensions being separated from the body, substantially as set forth.

2. A nut-locking key formed with a body or wedge portion, 1, and with a head, 2, and having at the inner edge of such head flanges 3 3, extended at right angles therefrom and in opposite directions on opposite sides of the body or wedge, all substantially as and for the purpose specified.

STEPHEN H. FRENCH.
WILLIAM J. MALTBY.

Witnesses:
W. A. HINDS,
D. RICHARDSON.